3,810,789
ELECTROCHEMICAL CELL HAVING CATHODE
MASS COMPRISING HOLLOW CARBON BODIES
Cornelis Geerhard Vermeulen and Joris Jan Cornelis
Oomen, Emmansingel, Eindhoven, Netherlands
Filed June 30, 1972, Ser. No. 268,210
Claims priority, application Netherlands, July 3, 1971,
7109225
Int. Cl. H01m 35/00
U.S. Cl. 136—6 LN                  5 Claims

ABSTRACT OF THE DISCLOSURE

An electrochemical cell comprising ammonia as a solvent for the electrolyte whose cathode mass comprises hollow carbon bodies closed on all sides. The cell may be loaded for long periods at a low temperature without the E.M.F. decreasing considerably.

---

The invention relates to a cell which comprises a plurality of electrochemical elements in which ammonia is used as a solvent for the electrolyte.

A known cell of this kind is described, for example, in the Proceedings of the 17th Annual Power Source Conference, May 21, 22 and 23, 1963, pp. 128–131. A mixture of a depolarizer, carbon and cellulose is used as a cathode in the known cell. For example, meta-dinitrobenzene may be used as a depolarizer. In the known cell graphite is used as carbon in the form of powder and cellulose is used in the form of fibres.

In some embodiments of the known cell the E.M.F. decreases very rapidly at a relatively high load to values at which the cell is no longer suitable for practical purposes when it is used at low temperatures, for example, $-20°$ C. and less. When the cell is used for supplying an electrical current during a short period as is, for example, the case for some uses this is of little disadvantage. When the cell is used at a comparatively low temperature, for example, at temperatures of $-20°$ C. and less for supplying electrical current during a comparatively long period, this is a considerable drawback.

An object of the invention is to obviate this drawback.

It has been found that this is possible by replacing cellulose in the cathode entirely or partly by omnilaterally closed, hollow bodies whose walls consist of carbon. These bodies may be convex and may be, for example, of the kind described in a lecture held at the Sixty-Seventh Annual Meeting of the American Institute of Chemical Engineers, Materials Engineering and Sciences Division Biennial Conference, Atlanta, Ga., Feb. 15–18, 1970. These hollow globular carbon bodies closed on all sides have a particle size of between 5 and $150\mu$ in diameter; the mean diameter is approximately $40\mu$. The thickness of the wall is 1 to $2\mu$. The bulk density is 0.13–0.14 g. per cubic cm.

The invention relates to a cell which comprises a plurality of electrochemical elements in which ammonia is used as a solvent for the electrolyte and a mixture comprising a depolarizer and carbon is used as a cathode and is characterized in that the cathode partly consists of hollow carbon bodies closed on all sides.

To describe the invention in greater detail FIG. 2 shows the results of measurements on a known cell and FIG. 1 of a cell according to the invention. Both cells had the same construction and dimensions. They only differ with reference to the composition of the cathode, on the understanding that the cathode of the known cell contains cellulose and that the cathode according to the invention contains the same quantity by weight of hollow carbon pellets closed on all sides instead of cellulose. Magnesium was used as the anode in both cells. In the known cell the cathode consisted of finely divided constituents; in the cell according to the invention all constituents for the cathode were likewise finely ground, except for the hollow carbon bodies closed on all sides. These were hollow pellets closed on all sides having different diameters. The diameter varied between 5 and $150\mu$ with a mean value of approximately $40\mu$. The wall thickness of the carbon pellets was $1-2\mu$. The bulk density was 0.135 g. per cubic cm.

In the known cell the cathode comprised meta-dinitrobenzene 5 parts by weight, graphite 5 parts by weight and cellulose 1 part by weight.

In the cell according to the invention the cathode comprised meta-dinitrobenzene 5 parts by weight, graphite 5 parts by weight and carbon pellets 1 part by weight.

The variation of the E.M.F. (V in volts) with time ($t$) was measured in each of the 10-element cells at a constant load of 47,000 ohms at $-40°$ C.; in FIG. 1, $t$ is indicated in hours, in FIG. 2 $t$ is indicated in minutes, in both figures V is indicated in volts.

FIG. 1 shows the result for the cell according to the invention and FIG. 2 shows the result for the known cell. It can be seen that in the known cell the E.M.F. substantially from the beginning decreases considerably and has decreased to substantially zero within approximately 20 minutes. In the cell according to the invention the decrease of the E.M.F. with time is only small. Even after 70 hours the E.M.F. is still 16 volts. At this E.M.F. the cell can still serve its purpose satisfactorily in many cases. At the beginning of the discharge the E.M.F. for the two cells was approximately 23 volts.

It has been found that satisfactory cells according to the invention are obtained when the cathode comprises 7 to 13% by weight of hollow carbon bodies closed on all sides of the previously mentioned kind and preferably 8–11% by weight. The quantities of the other constituents of the cathode may then vary as in the known cells.

Apart from the composition of the cathode a cell according to the invention may have the same construction as that of known cells in which ammonia is used as a solvent for the electrolyte. The embodiment of the cell may be, for example, the same as that described in U.S. patent specification 3,445,295.

A cell according to the invention may be used advantageously, for example, in equipment for meteorological observations in high level atmospheric regions.

Figure 1:
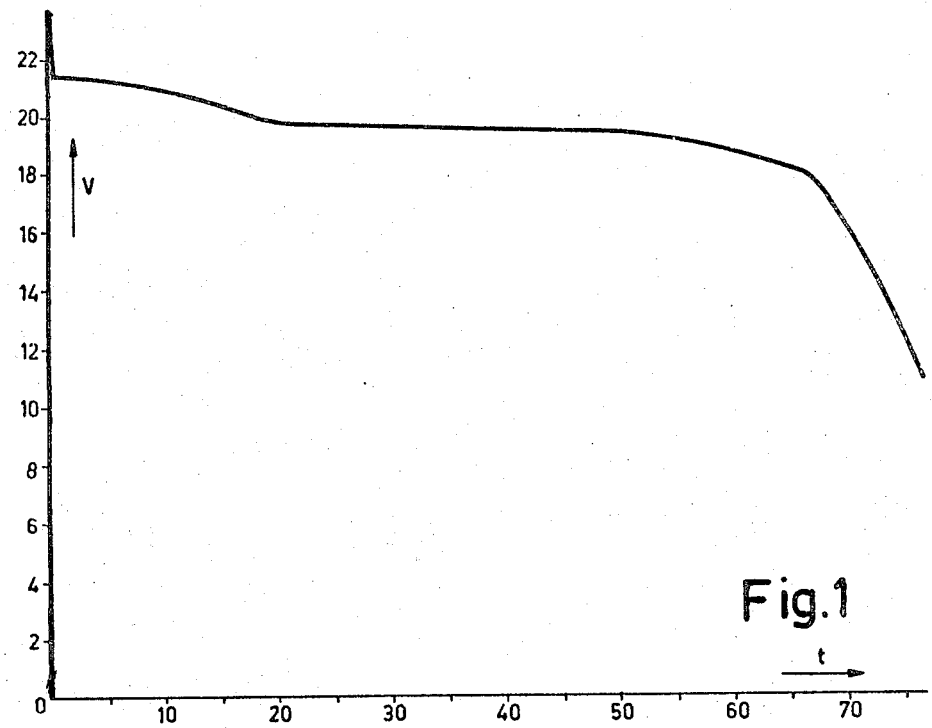
Figure 2:
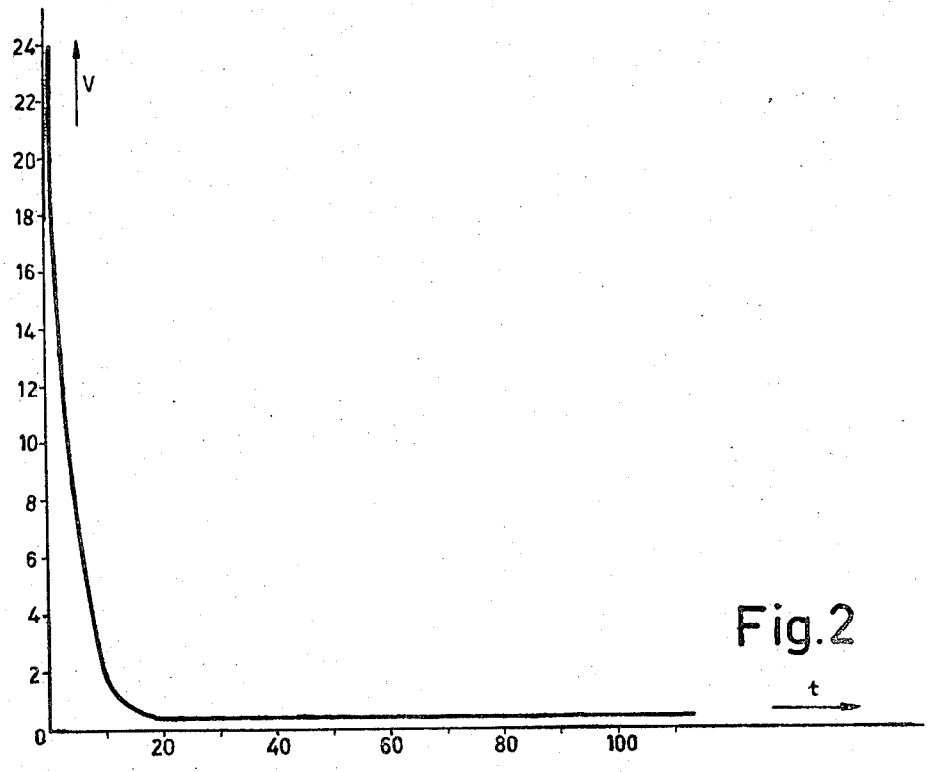
Figure 3:
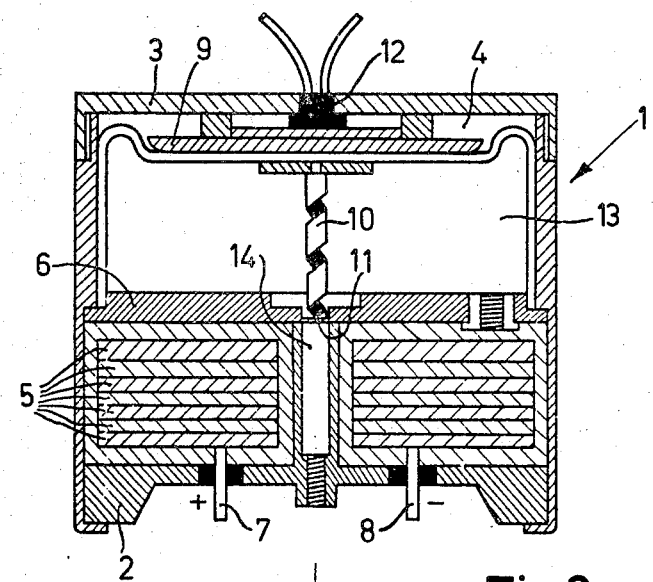
FIG. 3 is a vertical sectional view of a battery of the invention given by way of example.

Referring to the drawing and particularly to FIG. 3 the battery includes a general cylindrical outer shell or housing 1 enclosed at one end by a terminal plate 2 and at the other end by a cover member 3. The battery includes an activator section 4 and a battery section 5 which are separated by a bulkhead 6. The battery includes positive and negative leads 7 and 8, respectively, supported in plate 2 by isolating plugs. The activator section is of a conventional construction, for example as described in U.S. patent specification No. 3,445,295. In FIG. 3, the upper wall of the activator cup 9 mounts a drill lance 10 aligned with a thin walled area 11. Conventional means may be employed for activating the lance 10 and may consist for example of a chemical propellant admitted through an activating mechanism 12 in the top cover 3.

The lance 10 upon actuation downwardly pierces the thin wall area 11 to release the liquid ammonia of the container 13 from the activator section and permit it to enter the battery section 5.

In the example of the drawing the battery section consists of 7 separate cells. The ammonia can enter each cell by apertures contained therein and connecting each cell with the central channel 14.

Figure 4:
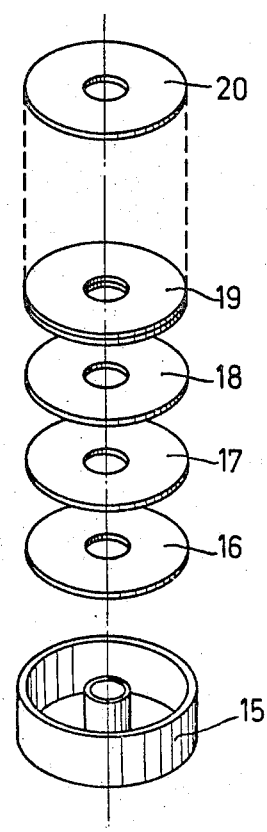
FIG. 4 shows the components of one cell in exploded assembly.

In FIG. 4 an exploded assembly of one cell of the invention is given. In this FIG. 15 is a cell cup, for example consisting of polypropylene, 16 is a cathode collector, e.g. consisting of silver, 17 is the cathode/mass partly consisting of hollow carbon bodies which are closed on all sides, 18 is a separator comprising the electrolyte salt, 19 an anode consisting of a thin disc of stainless steel on the upper side and a disc of magnesium bimetal on the lower side and 20 is the end seal consisting of polypropylene.

What is claimed is:

1. An electric current producing cell comprising an anode, an electrolyte dissolved in ammonia and a cathode containing carbon and a depolarizer, from about 7 to 13% by weight of said cathode consisting of imperforate hollow carbon bodies.

2. The cell of claim 1 wherein the hollow carbon bodies are hollow globular bodies.

3. The cell of claim 2 wherein the hollow globular bodies have a diameter from 5 to 150 $\mu$m. and a mean diameter of about 40 $\mu$m.

4. The cell of claim 3 wherein the hollow globular bodies have a wall thickness of from 1 to 2 $\mu$m.

5. The cell of claim 2 wherein about 8 to 11% by weight of the cathode consists of imperforate hollow carbon globular bodies.

References Cited

UNITED STATES PATENTS

| | | | |
|---|---|---|---|
| 3,235,408 | 2/1966 | Harris | 136—137 X |
| 3,239,384 | 3/1966 | Meyers | 136—137 X |
| 3,433,673 | 3/1969 | Duddy | 136—22 |
| 3,445,295 | 5/1969 | Smith et al. | 136—100 RX |
| 3,532,546 | 10/1970 | Harris | 136—83 R |

OTHER REFERENCES

Proceedings of the 17th Annual Power Sources Conference, May 21–23, 1963, pp. 128–131.

ANTHONY SKAPARS, Primary Examiner

U.S. Cl. X.R.

136—137

PO-1050
(5/69)

UNITED STATES PATENT OFFICE
CERTIFICATE OF CORRECTION

Patent No. 3,810,789        Dated May 14, 1974

Inventor(s) CORNELIS GEERHARD VERMEULEN ET AL

It is certified that error appears in the above-identified patent and that said Letters Patent are hereby corrected as shown below:

Column 1, line 5, after "Netherlands" insert

-- , assignors to U.S. Philips

Corporation, New York, N.Y. --.

Signed and sealed this     day of         1974.

Signed and sealed this 1st day of October 1974.

(SEAL)
Attest:

McCOY M. GIBSON JR.               C. MARSHALL DANN
Attesting Officer               Commissioner of Patents